(12) United States Patent
Spear, IV

(10) Patent No.: US 9,291,441 B2
(45) Date of Patent: *Mar. 22, 2016

(54) CONCRETE DECK MEASURING DEVICE

(71) Applicant: H. Houston Spear, IV, Plantation, FL (US)

(72) Inventor: H. Houston Spear, IV, Plantation, FL (US)

(*) Notice: Subject to any disclaimer, the term of this patent is extended or adjusted under 35 U.S.C. 154(b) by 85 days.

This patent is subject to a terminal disclaimer.

(21) Appl. No.: 14/319,776

(22) Filed: Jun. 30, 2014

(65) Prior Publication Data

US 2015/0075019 A1    Mar. 19, 2015

Related U.S. Application Data

(63) Continuation-in-part of application No. 13/401,120, filed on Feb. 21, 2012, now Pat. No. 8,763,270.

(51) Int. Cl.
   *G01B 3/28* (2006.01)
   *G01B 5/06* (2006.01)
   *G01F 23/04* (2006.01)

(52) U.S. Cl.
   CPC *G01B 3/28* (2013.01); *G01B 5/066* (2013.01); *G01F 23/04* (2013.01)

(58) Field of Classification Search
   CPC ........... G01B 3/28; G01B 5/066; G01F 23/04
   USPC .......................................... 33/722, 518, 834
   See application file for complete search history.

(56) References Cited

U.S. PATENT DOCUMENTS

| | | | |
|---|---|---|---|
| 3,352,018 A * | 11/1967 | Mazeika | G01B 3/28 33/836 |
| 3,460,260 A * | 8/1969 | Sarlandt | G01C 15/06 33/292 |
| 3,821,854 A * | 7/1974 | Koch | G01B 3/28 33/544 |
| 4,077,129 A * | 3/1978 | Nishikata | G01B 3/18 33/784 |
| 4,216,585 A | 8/1980 | Hatter | |
| 4,292,739 A | 10/1981 | Dobbins | |
| 4,321,752 A | 3/1982 | Kaufman | |
| 4,642,900 A | 2/1987 | Provost et al. | |
| 4,848,149 A | 7/1989 | Fiorentino et al. | |
| 5,497,560 A * | 3/1996 | Pasquerella et al. | G01B 3/28 33/558.4 |
| 6,028,008 A | 2/2000 | Bayer et al. | |
| 6,274,033 B1 | 8/2001 | Hudgin | |
| 6,298,574 B1 * | 10/2001 | Baker | E01C 23/01 33/1 H |

(Continued)

FOREIGN PATENT DOCUMENTS

JP    1025893    1/1998
JP    10196116    7/1998

*Primary Examiner* — Christopher Fulton
(74) *Attorney, Agent, or Firm* — Malin Haley DiMaggio & Bowen, P.A.

(57) ABSTRACT

A device for measuring the depth of concrete comprising an elongated spine, a stepped blade attached at the distal end of the spine and having a plurality of bi-lateral steps having a predetermined width and height tapering toward the distal end of the spine, a depth probe slidably mounted longitudinally within an internal channel of the spine and including an indicator; and a scale aligned with the indicator. The depth probe may have a pointed or beveled distal tip which is useful for penetrating concrete or other aggregate materials. The stepped blade is provided into concrete and comes in contact with the top of the rebar grid, with the steps measuring the depth of the concrete cover over the rebar. The depth probe is plunged into the concrete until the tip reaches the bottom. The scale measures the distance between a distal tip of the depth probe and the leading edge of the blade.

15 Claims, 13 Drawing Sheets

(56) References Cited

U.S. PATENT DOCUMENTS

| | | |
|---|---|---|
| 6,412,185 B1 | 7/2002 | Mills et al. |
| 7,735,232 B2 * | 6/2010 | Bahler .................... E04F 21/04 33/518 |
| 8,322,044 B2 | 12/2012 | Gregory et al. |
| 8,763,270 B1 * | 7/2014 | Spear, IV ............... G01B 5/066 33/518 |
| 2005/0268714 A1 | 12/2005 | Watson |

* cited by examiner

CONCRETE DECK MEASURING DEVICE

CROSS REFERENCE TO RELATED APPLICATIONS

This application is a continuation-in-part of application Ser. No. 13/401,120 filed Feb. 21, 2012, now U.S. Pat. No. 8,763,270.

STATEMENT REGARDING FEDERALLY SPONSORED RESEARCH OR DEVELOPMENT

N/A

BACKGROUND OF THE INVENTION

1. Field of the Invention

The present invention generally relates to depth gauges and measuring devices and more particularly to a device for measuring the depth of concrete decks, roads, streets, highways, and related structures.

2. Description of Related Art

Most modern bridges and similar structures are constructed by pouring a concrete deck over a matrix of beams. Once the beams matrix is placed, forms or molds are connected to the beams to provide support for the plastic concrete as it is poured and finished in accordance with a predetermined construction plan or blueprint. Typically, two layers or grids of tied rebar are placed on top of the beams before the concrete is poured. The rebar provides internal structural support for the eventual concrete slabs that will be formed. As is well known in the art, the process of pouring, consolidating, and finishing the concrete is a very fast paced operation usually occurring at night under severe time constraints dictated by the necessity for ingress/egress over the particular structure being built, repaired, or refinished.

In order to provide an acceptable deck within the timeframe that modern contractors are expected to work, mechanical screeds are used to finish the surface. These large truss-like machines ride on rails parallel to the deck being poured and, as the concrete is placed, the screed passes over the plastic concrete. Beneath the screed is a pair of rollers that are moved rapidly from one side of the screed to the other, smoothing the surface of the concrete. The operation of the screed is almost entirely automated.

Despite the rapid pace and stringent time constraints, concrete bridge decks are expected to be constructed in accordance with a set plan or blueprint and deviation from the plan can lead to increased costs due to repair, restoration, or complete reconstruction. Accordingly, as the screed progresses along the deck of the bridge, the total thickness of the deck and the depth of the layer concrete over the top grid of rebar (i.e. cover) is measured at random locations, usually by an onsite construction engineering inspector (CEI). Many times, the contractors have their own quality control (QC) representative on site to take these measurements as well.

Traditionally, a CEI or QC representative will employ a rudimentary depth-measuring device such as a simple stiff wire, dowel, or the like. The inspector typically inserts such a wire or dowel into the concrete, removes it, and then measures the length of cement paste left on the wire/dowel with a tape measure. In addition to using such a stiff wire or dowel to determine the total depth, a metal plate is often used to measure depth of the concrete cover over the top grid of rebar. If shallow spots are discovered, either with respect to total depth or the rebar cover, the screed must be adjusted in order to minimize the deficiencies and assure that the rest of the deck is placed correctly.

There are a few problems and disadvantages that are apparent when the stiff wire or dowel rod method of inspection is used. First, the inspector is often charged with creating his own tool, be it a stiff wire, straightened coat hanger, or dowel. At first thought, one might find these simple devices so readily available that this would hardly seem a problem; however, plastic concrete is not that soft of a material so a typical wire, coat hanger, rod, or dowel can easily deflect and/or be deformed by the coarse aggregate, particularly over a series of measurements. While a dowel rod might be somewhat larger and less prone to deflection or deformity, the bottom end can often times hit a coarse aggregate squarely, giving the inspector the false impression that the deck is not thick enough in that particular location.

In addition to the problems encountered while measuring the total thickness of the deck, the inspector must also measure the depth of the concrete cover over the rebar. This is typically accomplished with a tool, also of the inspector's fabrication, that must be large enough to span the largest spacing in the rebar grid, typically 12 inches (but the desired width may vary depending on the concrete application). Some inspectors employ a carpenter's square, L-shaped ruler, or rebar with an L-shaped bend. Accordingly, in order to measure both the depth of the cover and the total depth of the concrete, the inspector necessarily must fabricate, carry, and subsequently carry out measurements with two tools. With this equipment, inspectors must, at every point, insert the wire into the plastic concrete to the full depth, extract the wire, and then measure the smear of cement paste on the wire with a tape measure. The process must then be repeated with the L-shaped bar in order to measure the cover depth. Both readings must be taken behind the rollers of the screed (a safer method that results in footprints in the finished concrete) or just in front of the rollers (a method that leaves no signs of testing in the final concrete but only allows several seconds to measure before the rollers make another pass) while the concrete forming process is being carried out. The time constraints and cumbersome nature of employing two tools and a tape measure eventually leads to hasty and inaccurate depth measurement. Accordingly, there is a clear need for an improved depth measurement tool that allows the inspector to easily measure both the total concrete depth as well as the cover depth without the need for multiple tools or external measuring devices, such as a tape measure.

Several attempts at providing such an improved tool have been made, however none have sufficiently solved the problems outlined above. For example, U.S. Pat. No. 7,735,232 to Bahler, describes paver or brick bed shaping tool incorporating a depth measuring gauge. This device includes a guide member, screed member, and adjustable hardware for assembling them for relative movement between the major components. This device is used to shape a paver or brick bed under layer as well as measure depth, and provides for adjustability. The guide member has a pair of extension arms protruding laterally from the device at two different, fixed heights for measuring the differing depth of deck layers, for example sand, base materials, pavers or the like. The screed member is dragged across the base paving layer perpendicular to the surface in order to shape the layer. Accordingly, this device can measure and shape and control the depth of both a base layer and an overlying upper layer which are used in preparation of a bed for installation of additional materials.

U.S. Pat. No. 6,298,547 to Baker illustrates a bituminous paving depth gauge, used to measure a hot bituminous pavement layer before compaction to determine proper material depths. The mechanical device includes a top reading paving depth gauge to determine the thickness of the paving layers. The gauge includes a depressible rod operatively associated with a structural rod support system. The rod has a bottom portion that is slidably mounted within the rod support. The upper section includes a graduated measuring gauge fixed on the rod support system. The lower section has a bottom support device fixed to this end of the rod support system, and acts as a "foot" for the measuring gauge. Accordingly, while providing a general depth gauge, the device in Baker fails to provide a means to measure a concrete cover layer which may be disposed above a grid of rebar or other support structure having interstitial spacing. Additionally, the foot of the device in Baker will not provide a stable base for measuring depths of concrete below the rebar grid.

U.S. Pat. 3,460,260 to Sarlandt relates to a grade setter for determining variations in grade levels for example in roads, streets or highway construction. An example is given of a completed paved highway as normally requiring three (3) levels which must be determined, for example a base level above the soil, the level of the concrete above the level of aligned treated base, as well as an additional level of pavement above that of the concrete. This device includes markers at selectable levels along a rod which has oppositely progressing scales with a common zero at predetermined distance above the rod. A slide mounts a horizontal telescope which has on one face a scale progressing downwardly and on another face a scale progressing upwardly from a lower telescope holder. The separate faces carry cursor for correlating the slide scale with the adjacent rod scale which is seen through a window. The device is plunged into a base layer on top of a hub having a stake of a known depth until the device makes contact with the top edge of the hub, then a measurement can be taken. The measurement is relative to the hub stake depth. Sarlandt does not provide a measure to measure a depth of concrete below a supporting rebar grid nor does it provide a blade for measuring the cover above the rebar.

It is, therefore, to the effective resolution of the aforementioned problems and shortcomings of the prior art that the present invention is directed. However, in view of the concrete depth measurement devices in existence at the time of the present invention, it was not obvious to those persons of ordinary skill in the pertinent art as to how the identified needs could be fulfilled in an advantageous manner.

SUMMARY OF THE INVENTION

The present invention provides a device for measuring the depth of concrete or other plastic or semi-plastic aggregate comprising an elongated spine having a proximal end and distal end; a fixed blade attached at the distal end of the spine and having a plurality of bi-lateral steps tapering toward the distal end of the spine, whereby steps having a predetermined width and height; a depth probe slidably attached longitudinally along the spine, or alternatively slidably attached within a central space of the spine, and including an indicator; and a scale aligned with the indicator. The depth probe may have a pointed or beveled distal tip which is useful for penetrating concrete or other plastic aggregate materials.

The stepped blade includes a leading edge which is tended to be provided into a concrete or plastic aggregate bed whereby the leading edge is placed in contact with a top layer of a rebar grid, typically across two pieces of rebar. This provides the initial distance reference point, and the depth of the concrete above the rebar grid can be measured by observing the steps of the embedded blade, which have a predetermined height. Next, the depth probe is plunged into the concrete and the tip of the depth probe comes in contact with the base on which the concrete is being poured. The scale of the device is configured to measure the distance between a distal tip of the depth probe and the leading edge of the blade. Thus, the indicator travels along the scale as the depth probe is displaced downward, with the scale being "zeroed" with respect to the leading edge of the blade.

In some embodiments, the depth probe is slidably mounted on the spine by one or more mounts which may be configured as L-shaped brackets or the like, having an aperture which receives the depth probe. The depth probe further may include a handle at its proximal end, providing a gripping point for the user. Further, in some embodiments, to maintain the integrity of the depth probe during use, a retaining bracket may be attached at the proximal end of the depth probe which is wrapped around one or more sides of the spine. In some cases the retaining bracket is U-shaped and engages two opposing sides of the spine, thus limiting the lateral and rotational displacement of the depth probe during use.

In other embodiments, the depth probe is slidably mounted within a central space or channel defined by the spine. A handle controls manipulation and articulation of the probe, one or more retaining brackets slide along the sides of the spine to provide stability, and a plurality of probe mounts utilizing pulleys, bearings or the like allow for the probe's sliding engagement within the spine.

Accordingly, it is an object of the present invention to provide a multi-purpose device for measuring the depth of various aspects of a concrete or other plastic aggregate bed that is accurate and easy to operate.

It is another object of the present invention to provide a multi-purpose device that includes the ability to measure the cover of plastic concrete over the top grid of rebar with a stepped blade having steps of a predetermined height.

It is yet another object of the present invention to provide a multi-purpose device for measuring the depth of a plastic concrete bed utilizing a depth probe having a pointed or beveled tip and configured to translate over a measured scale to provide an immediate depth measurement.

It is yet another object of the present invention to provide a multi-purpose device for measuring the depth of a plastic concrete bed utilizing a depth probe having an indicator configured to translate over a measured scale to provide an easy to read measurement.

It is yet another object of the present invention to provide a multi-purpose depth measuring device that is self-contained such that the user need not carry or implement any additional tools or measuring devices around the work site.

It is yet another object of the present invention to provide a multi-purpose depth measuring device that is durable and capable of being provided in a variety of concrete and other plastic aggregate materials regardless of the size, shape, and volume of solid aggregate material.

In accordance with these and other objectives which will become apparent hereinafter, the instant invention will now be described with particular reference to the accompanying drawings.

DETAILED DESCRIPTION

Figure 1:
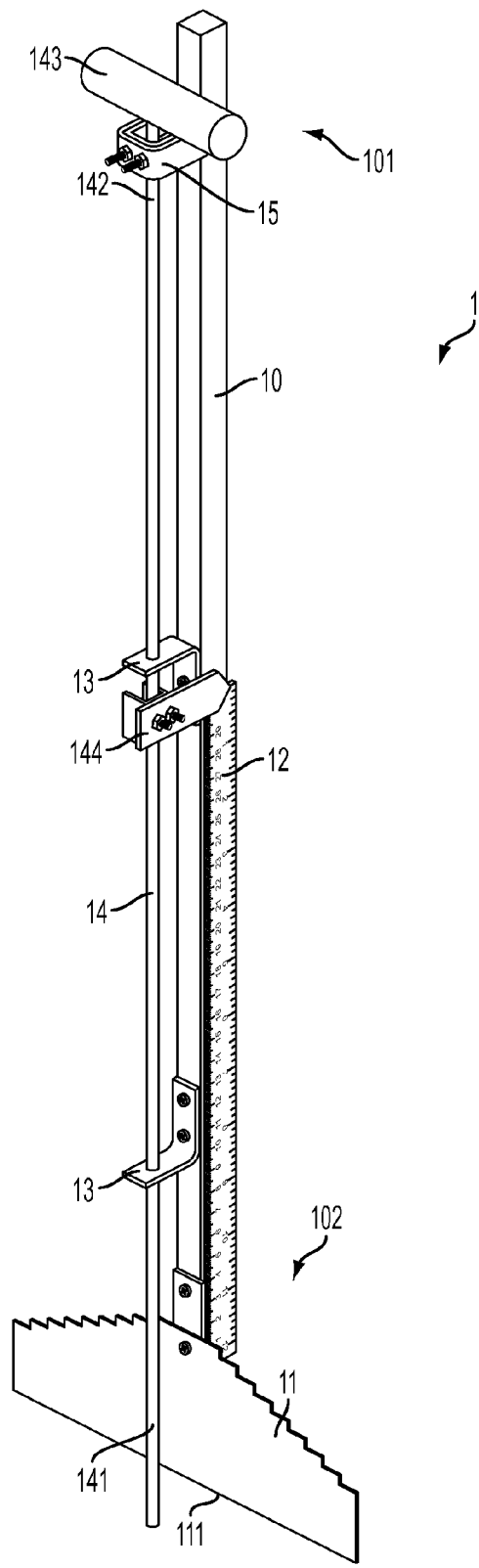
FIG. 1 is a perspective view of one embodiment of the present invention.

FIG. 1 is a perspective view of one embodiment of the present invention. Shown is measuring device 1 comprising a primary support spine 10 having a proximal end 101 and a distal end 102. Support spine 10 comprises an elongated substantially rigid member configured as a rod or similar structure. Spine 10 may have any suitable cross-section sufficient to provide rigid support. For example, spine 10 may have a circular, square, or rectangular cross section. In some embodiments, spine 10 comprises a length of square bar composed of steel, aluminum, another like metal, or other suitable lightweight rigid material. Other materials and configurations of spine 10 are contemplated, provided spine 10 is suitably rigid to support its attendant components and to carry out the intended functions disclosed herein.

Fixed to the distal end 102 of spine 10 is a stepped blade 11 which, in some embodiments, is transversely disposed with respect to the length of spine 10. Stepped blade 11 functions as a concrete cover depth gauge as described below. Disposed along a side of spine 10 is a scale 12. Also disposed along a side of spine 10 is a plurality of probe mounts 13 which are configured to support and slidably engage depth probe 14. Depth probe 14 is configured as an elongated rod and, in some embodiments, includes a tapered or beveled distal end tip 141 which is useful for penetrating concrete or other aggregate during use. Depth probe 14 is disposed longitudinally along the length of spine 10 as shown. In some embodiments, one probe mount 13 is attached at the distal end 102 of spine 10 and another probe mount 13 is attached at an intermediate location along the length of spine 10. In some embodiments, the mounts 13 extend perpendicularly from the surface of spine 10 and may comprise L-brackets or similar structures attached to spine 10. The mounts 13 each include an aperture through which depth probe 14 is received, providing the slidable engagement.

Figure 3:
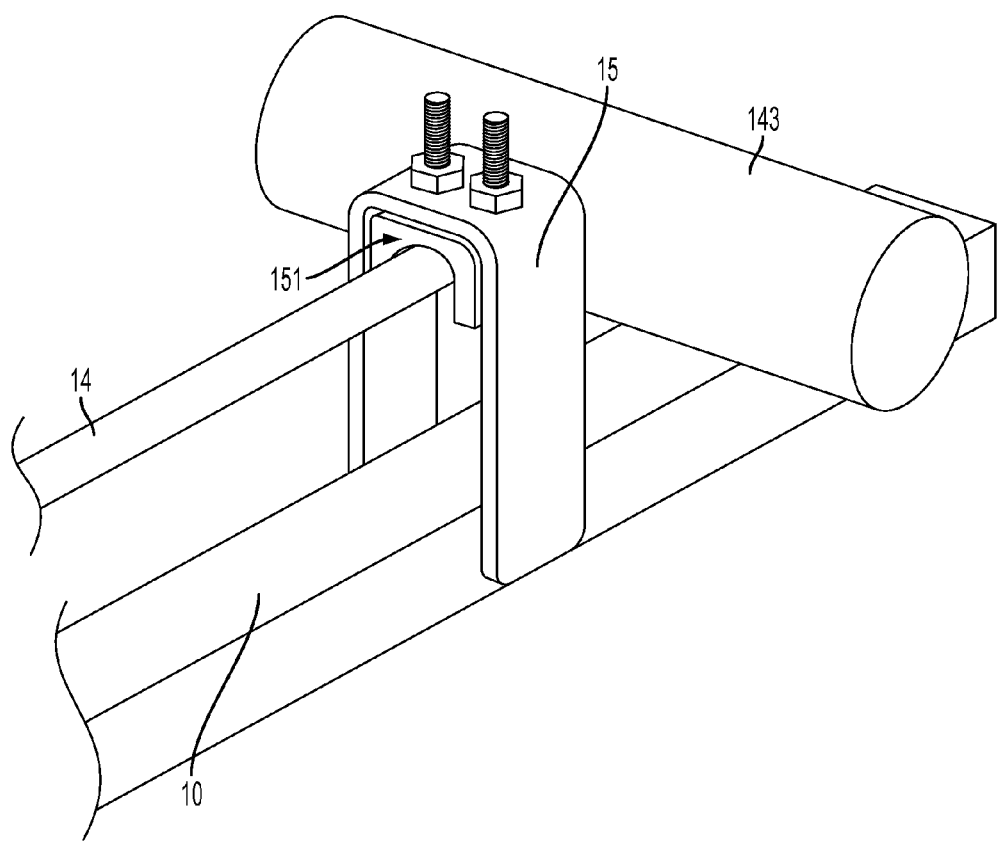
FIG. 3 is another perspective view of another aspect of the present invention.

Disposed at the proximal end 142 of depth probe 14 is a handle 143 which provides a grip for the user during manipulation and articulation of the depth probe. Also attached to the proximal end 142 of probe 14 is a retaining bracket 15. In some embodiments, as shown in FIG. 3, retaining bracket 15 is generally U-shaped extending around the lateral sides of spine 10. Retaining bracket 15 slides along the sides of spine 10 and assists in keeping depth probe 14 stable during operation. Retaining bracket 15 is configured to prevent unwanted spinning or rotation of depth probe 14 about spine 10 and assures that depth probe 14 travels in a solid, linear fashion along spine 10. In some embodiments, bracket 15 is dimensioned such that it fits snugly around spine 10 via a friction fit, but still allows for depth probe 14 to smoothly travel up and down without the need for excessive force by the user. In some embodiments, depth probe 14 is retained within bracket 15 by one or more anchors 151 which are mounted inside bracket 15 and receive depth probe 14.

Further still, in some embodiments, one or more nuts or other similar annular members are attached around certain points of depth probe 14 in order to limit its overall range of motion. For example, a nut could be placed slightly above the location of one of the mounts 13 in order to prevent the depth probe 14 from dislodging from the mounts 13 during use. Depth probe 14 is therefore configured to slide within mounts 13 and articulate back and forth along spine 10 in order to provide a measurement of depth.

Figure 2:
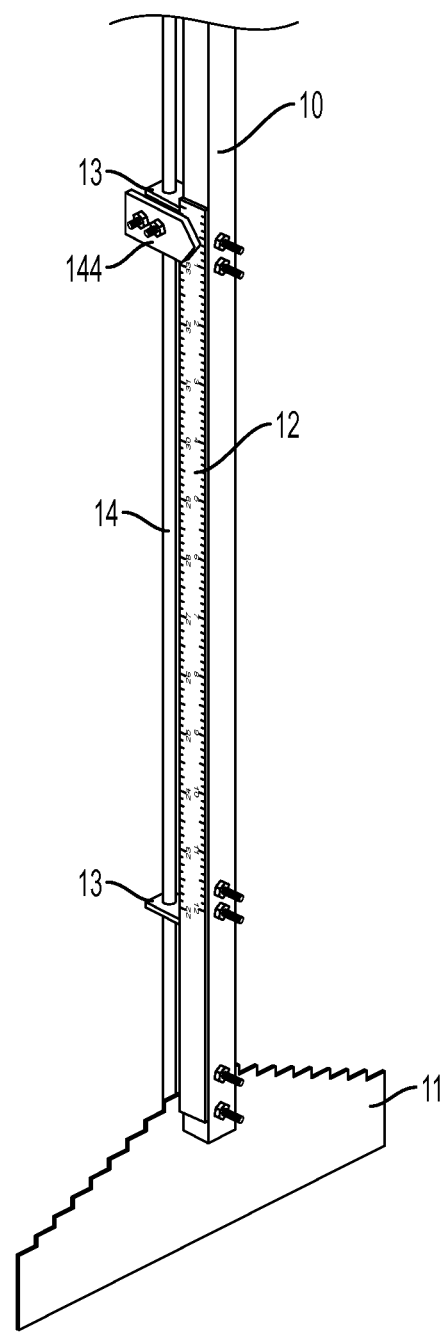
FIG. 2 is another perspective view of one aspect of the present invention.

Attached to depth probe 14 is an indicator 144. In some embodiments, indicator 144 is disposed between the two probe mounts 13. Indicator 144 is configured to travel over scale 12 and provides a point of reference as to the location and depth of depth probe 14 during measurement. As shown, in some embodiments, scale 12 is located on a side of spine 10 such that it is 90 degrees from the side that the depth probe 14 travels. This allows indicator 144 to travel over scale 12 as depth probe 14 moves. In some embodiments, indicator 144 is calibrated such that it is "zeroed" with respect to scale 12 when the tip of depth probe 14 is aligned with the leading edge 111 of stepped blade 11 (as shown in FIG. 1). As depth probe 14 travels downward with respect to spine 10, indicator 144 also travels downward (as it is attached to depth probe 14), moving along scale 12. Accordingly, scale 12 is configured to provide a measurement of the depth of depth probe 14 in a given unit of measurement with the "0" toward the middle of spine 10 with the scale increasing in measurement value downward toward the stepped blade 11. Scale 12 therefore measures the distance between the tip 141 of depth probe 14 and the leading edge 111 of blade 11. In one example, scale 12 is 14 inches long, with the "0" mark near the middle of spine 10 and the 14 inch mark toward distal end 102 of spine 10. FIG. 2 more closely shows the configuration and orientation of scale 12 with respect to indicator 144.

Figure 4:
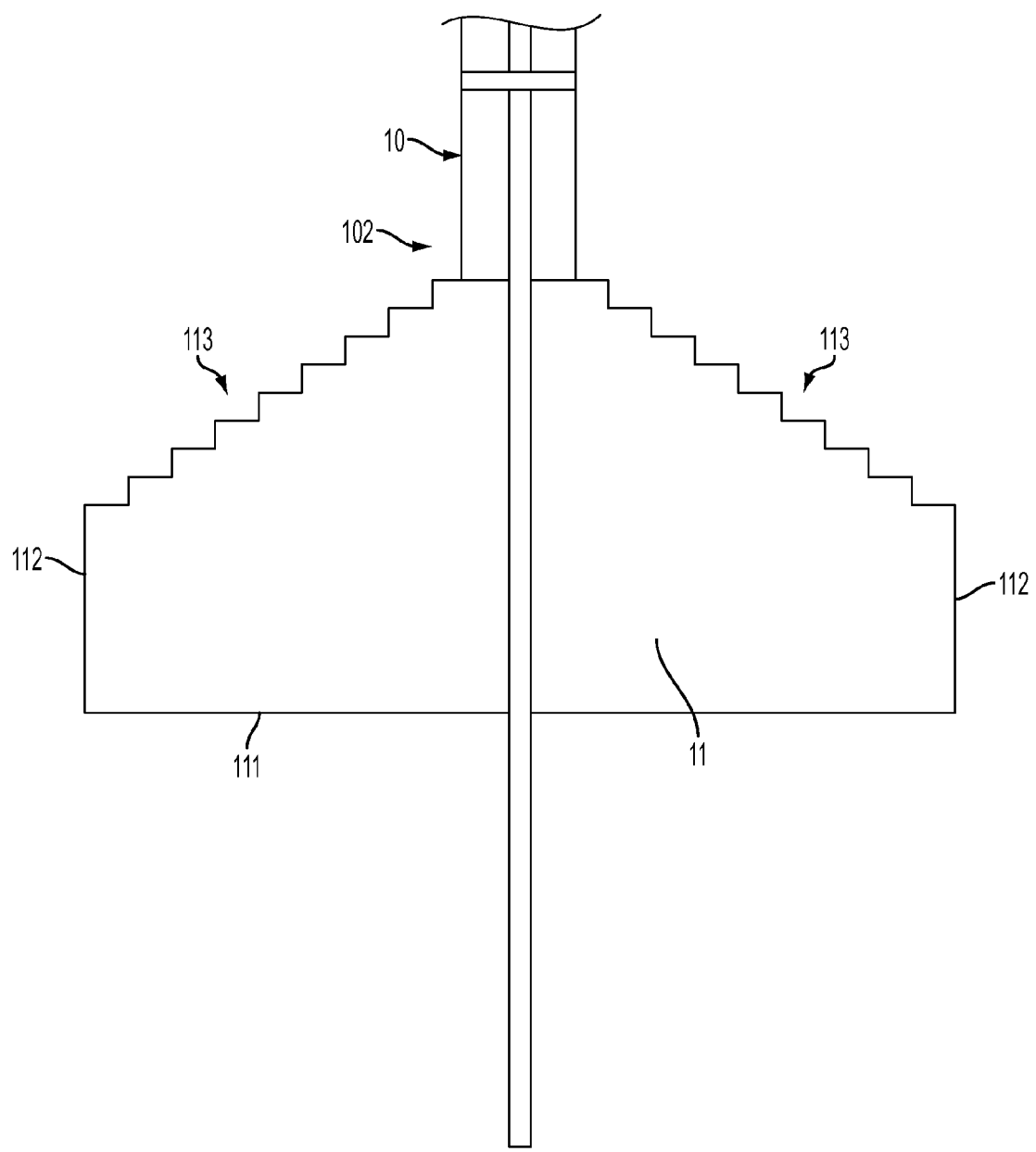
FIG. 4 is a top view of the stepped blade of the present invention.

FIG. 4 is a top view of one embodiment of the stepped blade 11 of the present invention. As shown, stepped blade 11 comprises a leading edge 111, two lateral side edges 112, and a plurality of steps 113 tapering inward toward the distal end 102 of spine 10. In some embodiments, steps 113 are all dimensioned equally, having the same predetermined width and height and are disposed bi-laterally with respect to spine 10. In one example, each step has a width of ½" and a height of ¼". As the stepped blade 11 is utilized to measure the depth of the cover of concrete above the top grid of rebar, the width and height are intended to be known values such that the user can determine that depth precisely. The stepped blade 11 may also have scale notations provided directly on its surface in order to aid the user in making measurements. For example, in some embodiments, if there is a desired standardized concrete cover depth blade 11 may include a marking at that particular depth such that the user can simply determine whether that depth has been met by the concrete application. In other embodiments, the blade 11 may have a plurality of markings for various depths such that the user can use the same tool for a multitude of jobs which having varied construction plans.

Figure 5:
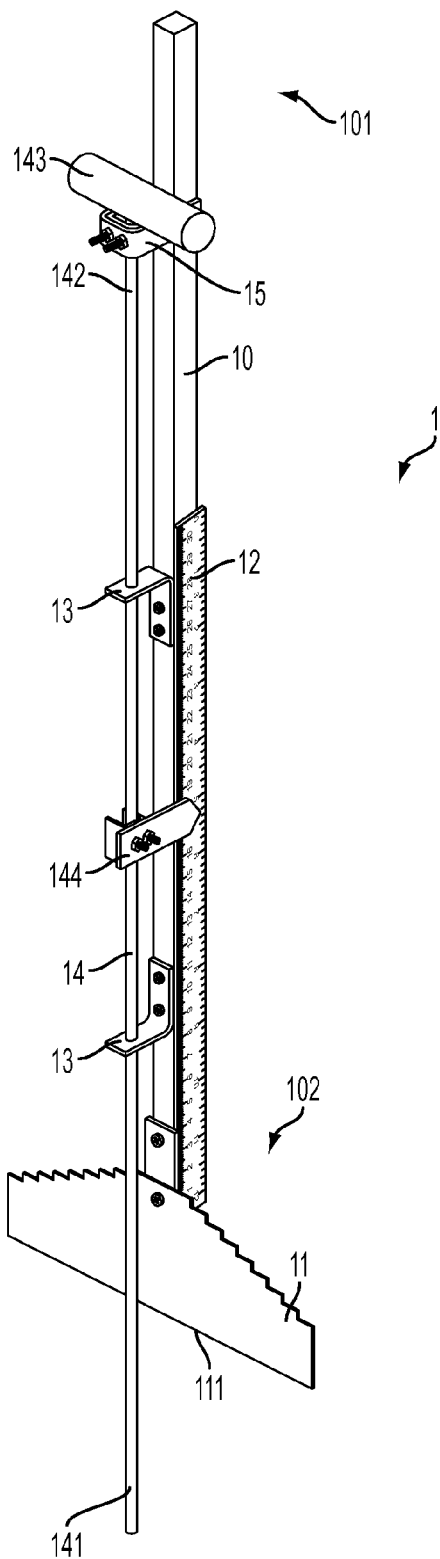
FIG. 5 is a perspective view of one embodiment of the present invention in a deployed position.
Figure 6:
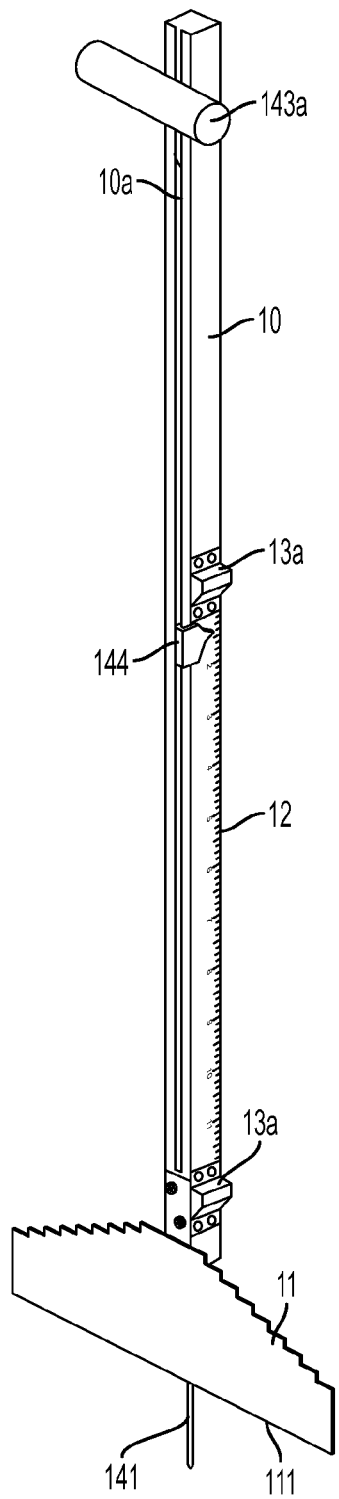
FIG. 6 is a perspective view of an alternative embodiment of the present invention.
Figure 7:
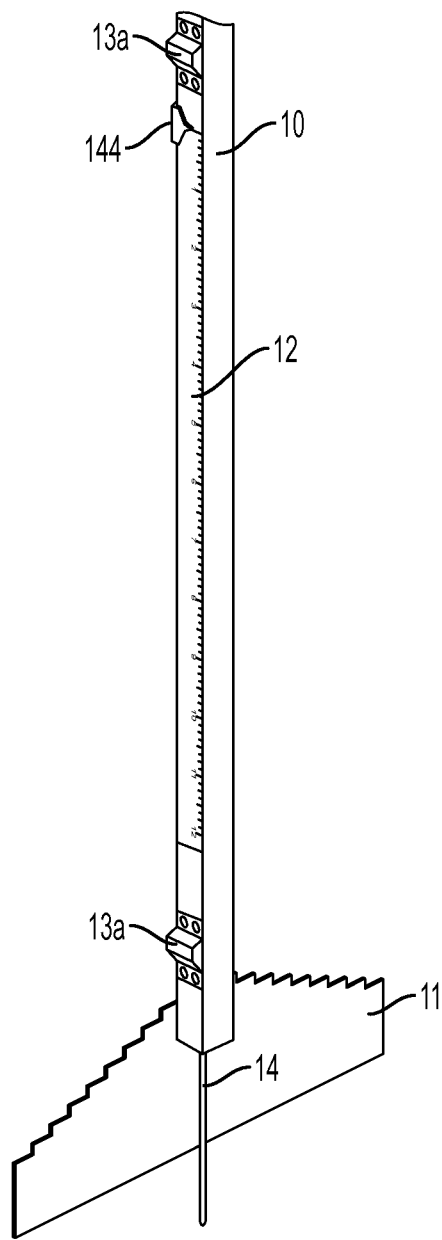
FIG. 7 is a partial perspective view of the alternative embodiment shown in FIG. 6.
Figure 8:
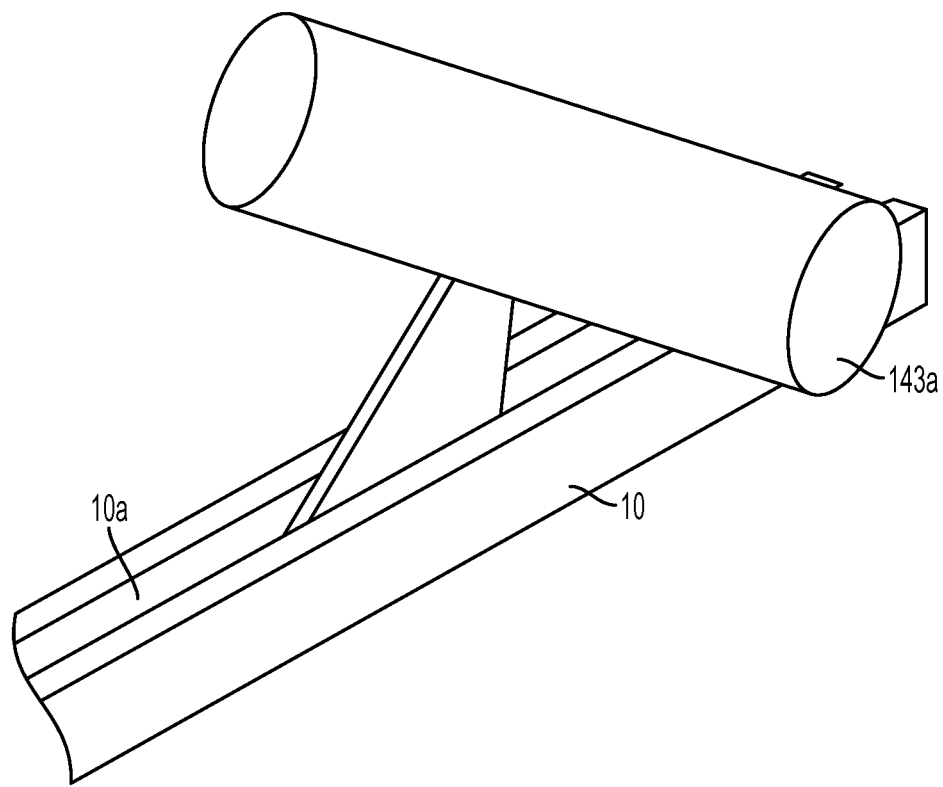
FIG. 8 is a partial perspective view of the handle assembly of the device shown in FIG. 6.
Figure 9:
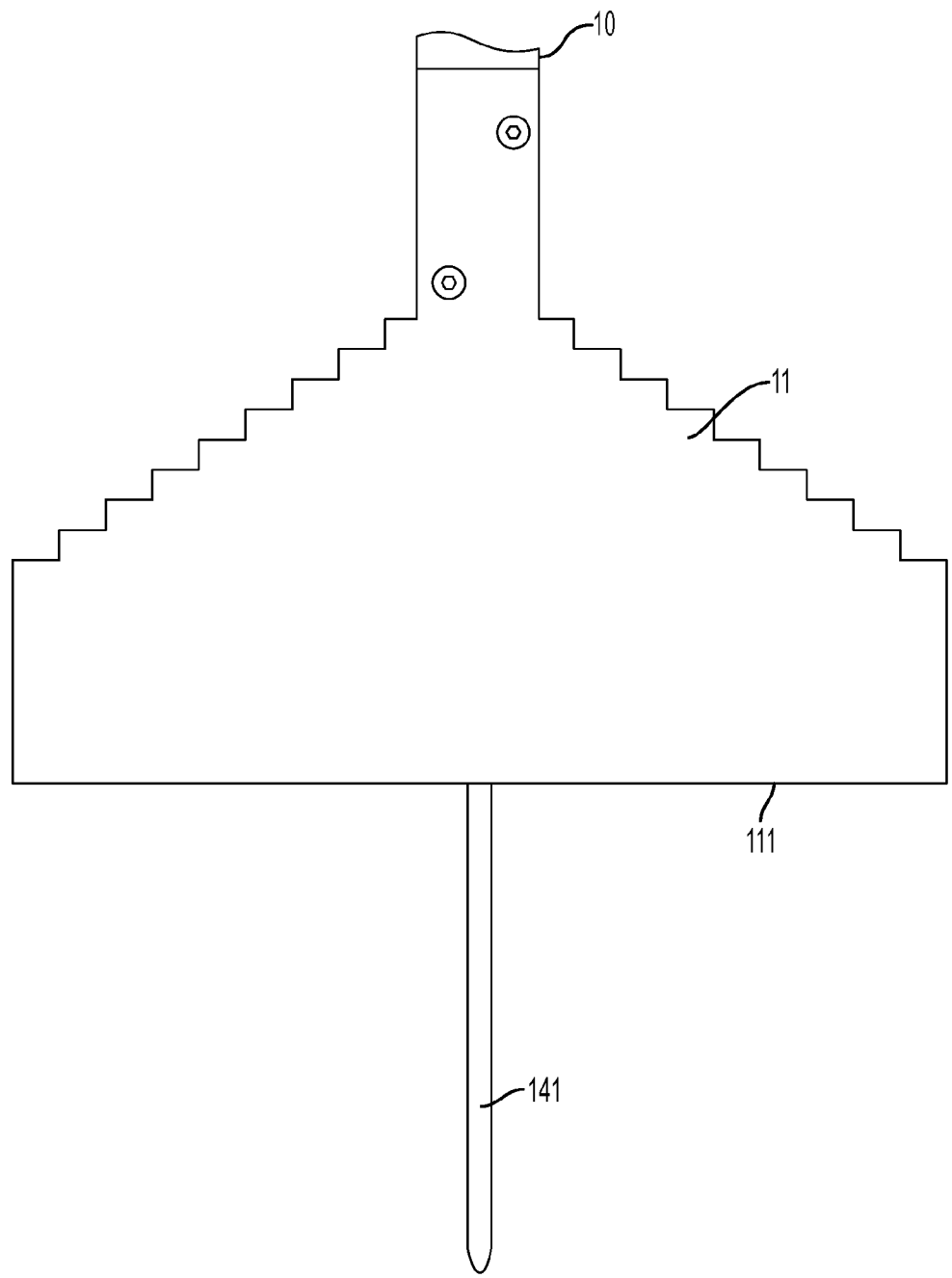
FIG. 9 is a partial perspective view of the stepped blade of the device shown in FIG. 6.
Figure 10:
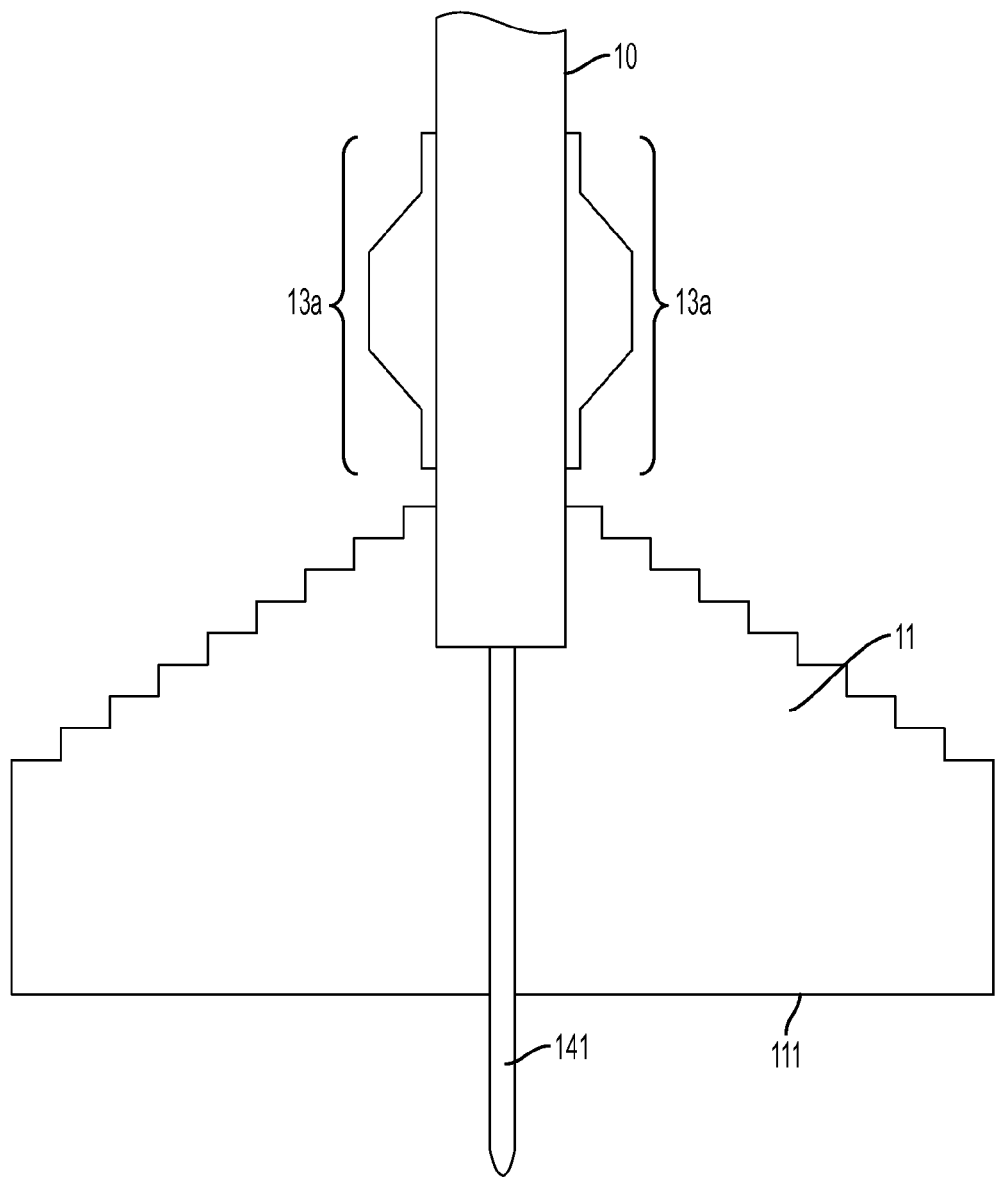
FIG. 10 is an alternative partial perspective view of the stepped blade and probe mounts of the device shown in FIG. 6.
Figure 11:
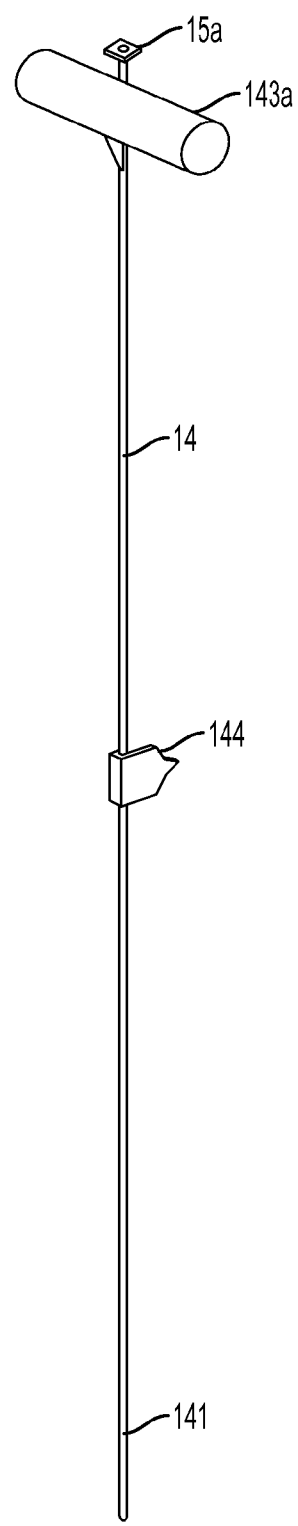
FIG. 11 is a perspective view of the probe and handle assembly of the device shown in FIG. 6.

In use, distal end 102 of device 1 is provided into a bed of concrete, preferably in a perpendicular fashion with respect to the surface of the concrete bed. The leading edge 111 is situated such that it makes contact with the top grid of rebar, and typically will be placed across two pieces of the grid of rebar. Starting with the depth probe 14 preferably in its zeroed position with respect to scale 12, depth probe 14 is plunged into the concrete bed with distal tip 141 penetrating the surface thereof. Typically, the user will grasp handle 143 in order to translate depth probe 14 downward. Depth probe 14 along with retaining bracket 15 slide downward along spine 10 until the distal tip 141 comes in contact with the bottom surface on which the concrete bed lies. The downward action of depth probe 14 causes indicator 141 (which is attached to depth probe 14) to travel along scale 12. Once depth probe 14 reaches the bottom surface, the user can observe the location of indicator 141 with respect to scale 12 and make a based bed depth measurement. FIG. 5 depicts the depth probe 14 in a deployed position, with distal end tip 141 extending well beyond the leading edge 111 of blade 11. Accordingly, in this example, the depth measurement will be the distance between the bottom surface on which the concrete bed is being placed and the top grid of rebar, in that the leading edge 11 is in direct contact with that top grid of rebar. The user can determine the total depth of the concrete bed by simply adding the cover depth to the base bed measurement.

The device 1 of the present invention may include additional convenience features. In some embodiments, scale 12 may be configured to extend downward beyond the distal end 102 of spine 10 and may be engaged with spine 10 by one or more slots. This allows scale 12 to move slightly up and down such that when the leading edge 111 of blade 11 is pressed against a section of rebar grid, the scale 12 can adjust upward to provide a dynamic total depth measurement. Further still, depth probe 14 could be outfitted with an agitator motor which can be activated to send vibrations along depth probe 14 so that the probe can more easily penetrate thicker concrete aggregate and/or move solid pieces of aggregate out of the way during deployment. This assures that the tip 141 of depth probe 14 can settle to the base of the concrete bed so that an accurate depth measurement can be obtained.

Figure 12:
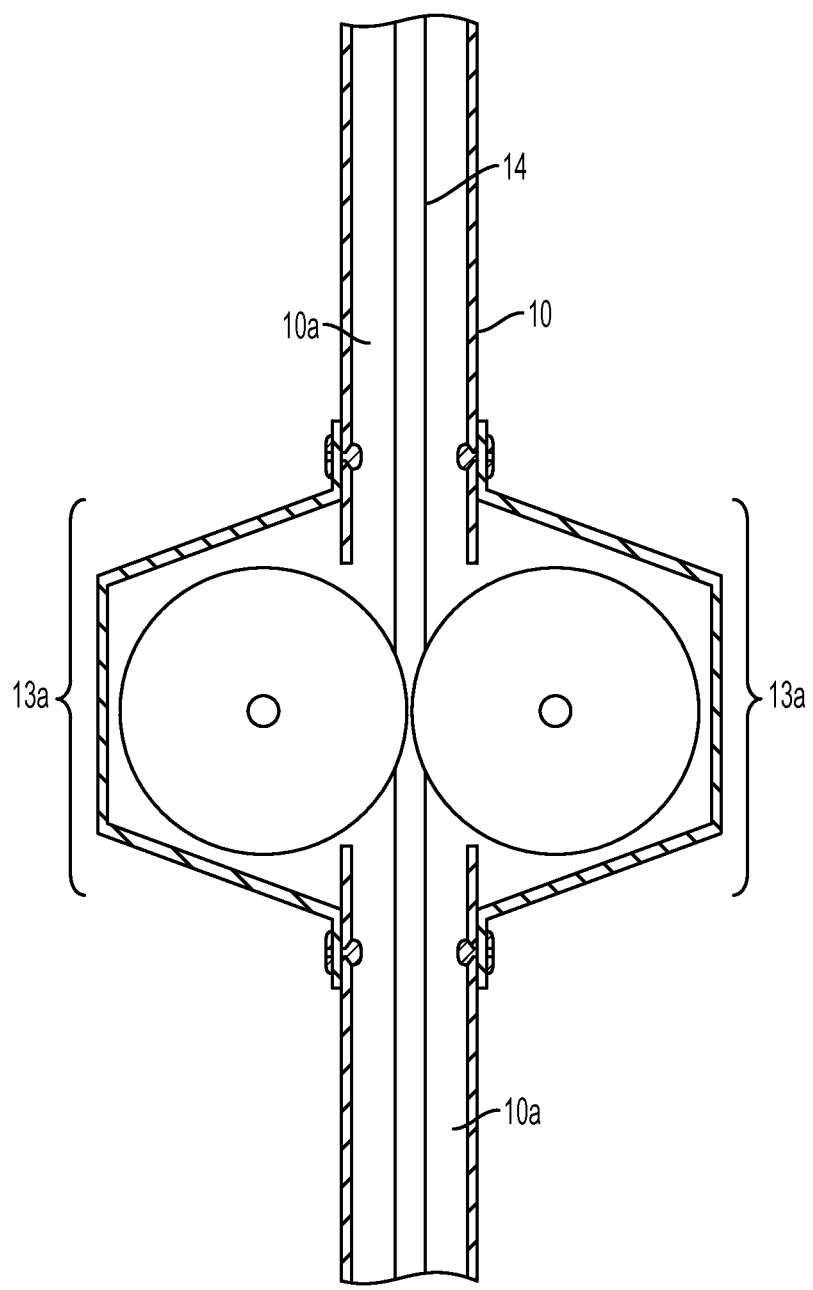
FIG. 12 is a partial perspective view of the probe, spine and probe mounts of the device shown in FIG. 6.
Figure 13:
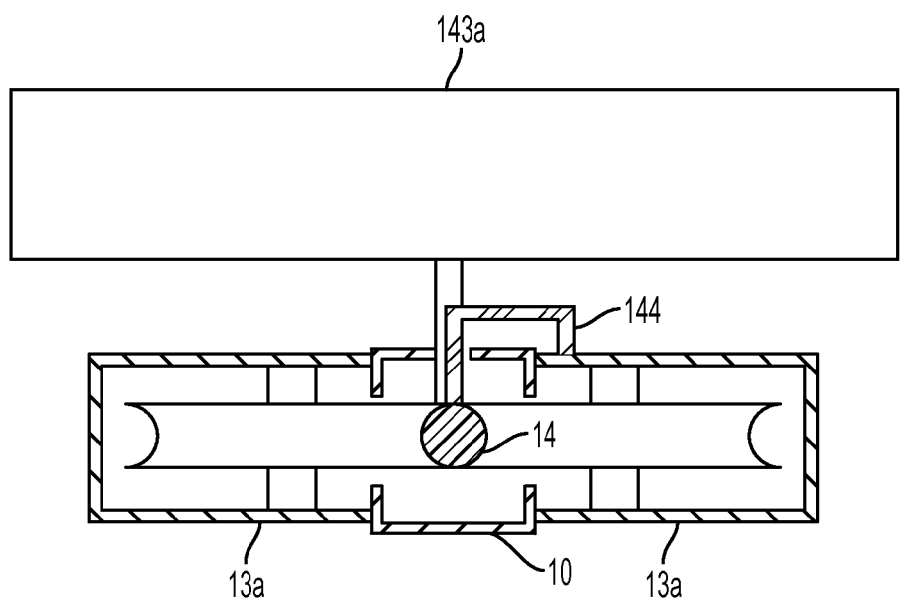
FIG. 13 is a top plan view of the probe, handle, spine, probe mounts and indicator of the device shown in FIG. 6.

With reference to FIG. 6 through FIG. 13, alternative embodiments of the invention are illustrated relating to designs in which the depth probe is internally secured within the spine. In the previous embodiments the plurality of probe mounts 13, which are configured to support and slidably engage depth probe 14, were comprised of L-brackets or similar structures attached to spine 10. In this alternative embodiment, the L-bracket supports are replaced with a plurality of probe mounts 13a which can consist of pulleys, bearings, internal brackets or similar mechanical structures that allow the depth probe to be slideably engaged within a central space or channel 10a of the spine 10. In the event that the depth probe mounts are larger than the spine they are mounted to the spine as illustrated with an opening in the spine to allow for contact to occur between the depth probe and the mounts as shown in FIG. 12.

Depth probe 14 is configured as an elongated rod and, in certain embodiments, includes a tapered or beveled distal end tip 141 which is useful for penetrating concrete or other aggregate during use as discussed above.

Disposed at the proximal end of 142 depth probe 14 is a handle 143a, which provides a grip for the user during manipulation and articulation of the depth probe. Although in this embodiment the handle is mounted to the depth probe by way of an offset mount that passes through a long narrow opening in the front of the spine 10, the description and functionality of the handle remain unchanged.

Also attached to the proximal end 142 of probe 14 is a retaining bracket. In some embodiments described above, the retaining bracket is generally U-shaped extending around the lateral sides of the spine 10. The retaining bracket slides along the sides of spine 10 and assists in keeping depth probe 14 stable during operation. A retaining bracket is configured to prevent unwanted spinning or rotation of depth probe 14 about or within spine 10, and assures that depth probe 14 travels in a solid linear fashion along spine 10. In certain embodiments, a bracket is dimensioned such that it fits snugly around or within spine 10 via a friction fit, but still allows for depth probe 14 to travel smoothly up and down without the need for excessive force by the user.

In this embodiment, the proximal end 142 of probe 14 will also include a retaining bracket 15a to slide along the inside of spine 10, preventing rotation and adding stability as probe is moved by a user. Here, the bracket that seats within the central area or channel 10a of the spine can be of a generally square shape, corresponding to the internal geometry of spine 10. It is appreciated to one of ordinary skill in the art, that the spine could be of alternative shapes, rounded or the like, and the retaining brackets would be of a corresponding shape or configuration compatible with the internal geometry of the spine. It is further appreciated that both the probe mounts and retaining brackets could be of several different structural designs and components that allow for sliding engagement within the spine channel 10a, all being within the inventive subject matter described.

Attached to depth probe 14 is an indicator 144. In specific embodiments, indicator 144 is disposed between two probe mounts 13a. indicator 144 is configured to travel over scale 12, and provides a point of reference as to the location and depth of depth probe 14 during measurement. In this embodiment indicator 144 is secured to depth probe 14 by welding or other suitable means to allow the indicator to protrude from the lengthwise, slender indicator channel or opening in the front of the spine 10 and still travel over scale 12 located on the side of spine 10 as described.

The configuration and calibration of this embodiment scales and stepped blade remain unchanged, as does the description of the functionality and the method in which the user utilizes the device.

It is appreciated that the present invention may be comprised of any suitable material or combination of materials provided the components maintain the necessary rigidity, durability, and reliability for continuous use of the device over time. For example, the device may comprise a variety of metals such as steel, stainless steel, aluminum, and the like. In some embodiments, the depth probe and/or the blade may be comprised of a non-corrosive material such as steel, stainless steel. As such, aluminum may not be preferred material for the depth probe or the blade due to its reactivity with concrete cement although treated alloys and other metal compositions may be serviceable. Components such as the handle and other aspects may comprise metals, woods, plastics, and combinations thereof. Additionally, it is contemplated that the present invention can be constructed as an integrated uni-body design or it may comprise a variety of components assembled by nuts, bolts, screws, rivets, welds and other known fastening and assembling means. To that end, the particular method and manner of constructing the present invention is not limited, provided the final product includes the structure and functionality described herein. Finally, it is appreciated that the present invention is not limited to measuring the depth of concrete but rather the present invention can be used to measure a variety of plastic and semi-plastic aggregate materials including asphalt and the like.

The instant invention has been shown and described herein in what is considered to be the most practical and preferred embodiments. It is recognized, however, that departures may be made therefrom within the scope of the invention and that obvious modifications will occur to a person skilled in the art.

What is claimed is:

1. A device for measuring the depth of concrete, comprising:
   an elongated spine, a blade, and a depth probe;
   said spine having an internal channel;
   said spine having a proximal end and a distal end;
   said blade attached at said distal end of said spine;
   said blade including a plurality of steps tapering toward said distal end of said spine, said steps having a predetermined width and height; and
   said depth probe slidably mounted within said spine internal channel.

2. The device of claim 1, further comprising one or more mounts attached within said spine and configured to slidably receive said depth probe.

3. The device of claim 1, wherein said depth probe includes a pointed distal tip.

4. The device of claim 3, further comprising a scale disposed along said spine.

5. The device of claim 4, wherein said scale measures the distance between said distal tip of said depth probe and a leading edge of said blade.

6. The device of claim 5, wherein a said depth probe includes an indicator, said indicator configured to travel over said scale to indicate said distance between said distal tip of said depth probe and said leading edge of said blade.

7. The device of claim 1, further comprising a handle disposed at a proximal end of said depth probe.

8. The device of claim 1, further comprising a retaining bracket attached at a proximal end of said depth probe, said bracket configured to slidably engage said spine within said internal channel.

9. The device of claim 8, wherein said retaining bracket is substantially square shaped.

10. The device of claim 1, wherein said predetermined width and height of each of said steps is the same.

11. A device for measuring the depth of concrete, comprising:
   an elongated spine having a proximal end and distal end,
   a blade attached at said distal end of said spine and having a plurality of bi-lateral steps tapering toward said distal end of said spine, said steps having a predetermined width and height;
   said spine having an internal channel;
   a depth probe slidably mounted within said spine internal channel and including an indicator; and
   a scale aligned with said indicator of said depth probe and configured to measure the distance between a distal tip of said depth probe and a leading edge of said blade.

12. The device of claim 11 wherein one or more mounts are attached within said spine and configured to slidably receive said depth probe.

13. The device of claim 11, further comprising a handle disposed at a proximal end of said depth probe.

14. The device of claim 11, further comprising a retaining bracket attached at a proximal end of said depth probe, said bracket configured to slidably engage one or more sides of said spine within said internal channel.

15. The device of claim 14, wherein said retaining bracket is substantially square shaped.

* * * * *